United States Patent
Cormier et al.

(10) Patent No.: US 9,194,504 B2
(45) Date of Patent: Nov. 24, 2015

(54) ROTATING VALVE

(75) Inventors: Sylvain Cormier, Mendon, MA (US);
James P. Murphy, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 810 days.

(21) Appl. No.: 13/144,133

(22) PCT Filed: Jan. 12, 2010

(86) PCT No.: PCT/US2010/020726
§ 371 (c)(1),
(2), (4) Date: Sep. 7, 2011

(87) PCT Pub. No.: WO2010/083147
PCT Pub. Date: Jul. 22, 2010

(65) Prior Publication Data
US 2011/0315633 A1    Dec. 29, 2011

Related U.S. Application Data

(60) Provisional application No. 61/144,521, filed on Jan. 14, 2009.

(51) Int. Cl.
| | |
|---|---|
| *F16K 11/06* | (2006.01) |
| *F16K 11/065* | (2006.01) |
| *F16K 11/083* | (2006.01) |

(52) U.S. Cl.
CPC ........... *F16K 11/0655* (2013.01); *F16K 11/083* (2013.01)

(58) Field of Classification Search
CPC ............................ F16K 11/083; F16K 11/0655
USPC ...................... 210/635, 656, 659, 198.2, 424; 137/625.46; 251/304
See application file for complete search history.

(56) References Cited

U.S. PATENT DOCUMENTS

| | | |
|---|---|---|
| 2,981,092 A | 4/1961 | Marks |
| 3,961,534 A | 6/1976 | Gundelfinger |
| 4,059,009 A | 11/1977 | Ball et al. |
| 4,068,528 A | 1/1978 | Gundelfinger |
| 4,112,743 A | 9/1978 | Mowery, Jr. |
| 4,182,184 A | 1/1980 | Bakalyar et al. |
| 4,242,909 A | 1/1981 | Gundelfinger |

(Continued)

FOREIGN PATENT DOCUMENTS

| | | |
|---|---|---|
| EP | 0 467 665 A2 | 1/1992 |
| EP | 1 455 185 B1 | 4/2012 |

(Continued)

*Primary Examiner* — Ernest G Therkorn
(74) *Attorney, Agent, or Firm* — Muirhead and Saturnelli, LLC

(57) ABSTRACT

Described is a rotary valve including a stator element and a rotor element. The stator element defines a first inlet passage, a second inlet passage, and a first outlet passage, respectively, having a first inlet port, second inlet port and first outlet port in a stator face. The rotor element has a rotor face in contact with the stator face and has a first channel and a second channel formed therein. The rotor element is rotatably movable about a rotational axis to at least a first position and a second position. In the first position, the first inlet port is fluidly coupled to the first outlet passage by the first channel and the second inlet port is fluidly coupled to the first outlet passage by the second channel. In the second position, the first inlet port is fluidly coupled to the first outlet passage by the first and second channels.

14 Claims, 5 Drawing Sheets

(56) References Cited

U.S. PATENT DOCUMENTS

| | | |
|---|---|---|
| 4,506,558 A | 3/1985 | Bakalyar |
| 4,625,569 A | 12/1986 | Toei et al. |
| 4,836,038 A | 6/1989 | Baldwyn |
| 5,105,851 A | 4/1992 | Fogelman |
| 5,131,998 A | 7/1992 | Jorgenson et al. |
| 5,389,221 A | 2/1995 | Jorgenson et al. |
| 5,390,552 A | 2/1995 | Demachi et al. |
| 5,462,660 A | 10/1995 | Singleton et al. |
| 5,496,460 A | 3/1996 | Jorgenson et al. |
| 5,958,227 A | 9/1999 | Uematsu |
| 6,382,035 B1 | 5/2002 | Nichols |
| 6,537,451 B1 * | 3/2003 | Hotier .................. 210/198.2 |
| 6,672,336 B2 | 1/2004 | Nichols |
| 6,802,967 B2 | 10/2004 | Masuda et al. |
| 6,874,354 B2 | 4/2005 | Cueni et al. |
| 7,213,615 B2 | 5/2007 | Cueni et al. |
| 7,377,291 B2 * | 5/2008 | Moon et al. .............. 137/625.46 |
| 7,544,293 B2 * | 6/2009 | Oroskar et al. ............ 210/198.2 |
| 8,349,175 B1 * | 1/2013 | Oroskar .................... 210/198.2 |
| 2002/0148353 A1 | 10/2002 | Seeley |
| 2003/0098076 A1 | 5/2003 | Nichols |
| 2004/0035789 A1 | 2/2004 | Wheat et al. |
| 2005/0098487 A1 | 5/2005 | Ito |
| 2005/0129539 A1 | 6/2005 | Kudo et al. |
| 2006/0156792 A1 | 7/2006 | Wang |
| 2008/0290309 A1 * | 11/2008 | Keene et al. .................. 251/324 |
| 2011/0272855 A1 | 11/2011 | Luongo et al. |

FOREIGN PATENT DOCUMENTS

| | | |
|---|---|---|
| JP | 2003-202332 | 7/2003 |
| WO | WO 02/39105 A1 | 5/2002 |
| WO | WO 2005/079543 A2 | 9/2005 |
| WO | WO 2006/083776 A2 | 8/2006 |
| WO | 2008036586 | 3/2008 |

* cited by examiner

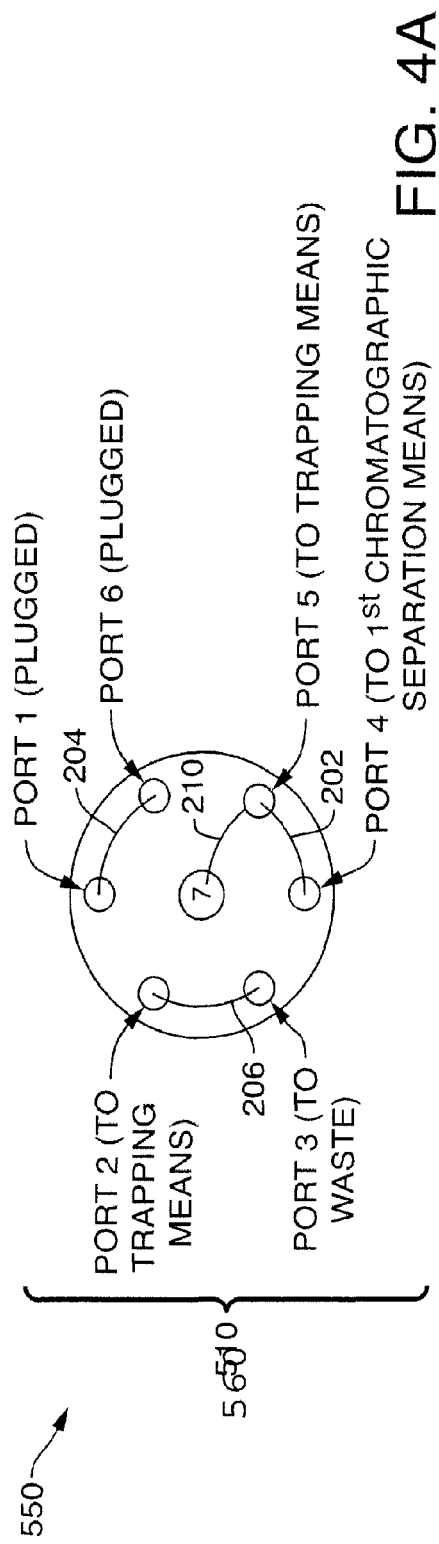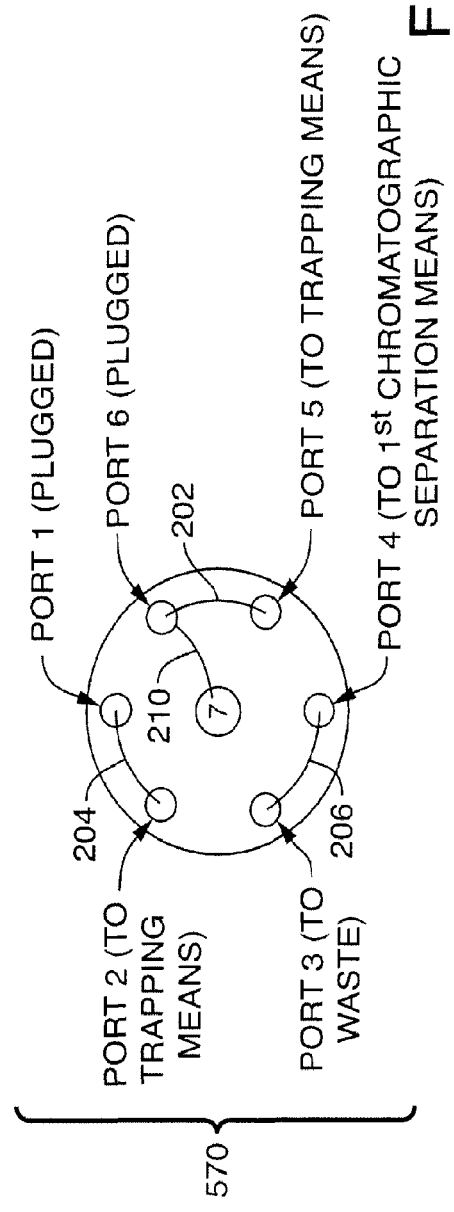

ROTATING VALVE

CROSS REFERENCE TO RELATED APPLICATIONS

This application is the National Stage of International Application No. PCT/US2010/020726, filed Jan. 12, 2010, which claims the benefit of U.S. Provisional Application No. 61/144,521, filed on Jan. 14, 2009. The contents of these applications are expressly incorporated herein by reference in their entirety.

BACKGROUND

1. Technical Field

This application generally relates to rotary valves as may be used in connection with chromatography.

2. Description of Related Art

Samples may be processed in a laboratory or other environment for a variety of different purposes and applications. Chromatography refers to techniques for separating sample mixtures. Common chromatographic techniques include gas chromatography (GC) and liquid chromatography (LC). With an instrument that performs LC, a liquid sample to be analyzed is introduced in small volumes for analysis. The sample may be injected into a solvent stream which is carried through a chromatographic separation column. The compounds in the sample can then be separated by traveling at different speeds through the column resulting in the different compounds eluting from the column at different times. In connection with High Performance Liquid Chromatography (HPLC) and Ultra Performance Liquid Chromatography (UPLC), pressure is used to facilitate fluid flow in the system through the chromatographic separation column.

When performing LC as well as more generally when processing a fluid, it may necessary to mix one fluid with one or more other fluids. In connection with LC, a connector, such as a T-shaped connector, may be used to facilitate the mixing. The connector may include two or more inlet ports and one outlet port. Fluid carried in a tubing or conduit may be introduced into one of the connector ports. Each port may establish a fluid tight seal with respect to a conduit inserted therein such as using a nut and ferrule or other means. The fluids introduced into the two or more inlet ports at a same time may be mixed or combined and output through the outlet port of the connector. Such connectors and associated tubing may add to the bulk and unwieldiness of an apparatus.

SUMMARY OF THE INVENTION

In accordance with one aspect of the invention is a rotary valve comprising a stator element defining a first inlet passage fluidly coupled to a first fluid source and having a first inlet port at a stator face and defining a second inlet passage fluidly coupled to a second fluid source and having a second inlet port at the stator face. The stator element further defines a first outlet passage having a first outlet port at the stator face. The rotary valve includes a rotor element having a rotor face in contact with the stator face and having a first channel and a second channel formed therein. The rotor face is in contact with the stator face in a fluid tight manner. The rotor element is rotatably movable about a rotational axis relative to the stator face for rotational movement of the rotor face to at least a first position and a second position. When in the first position, the first inlet port is fluidly coupled to the first outlet passage by the first channel and the second inlet port is fluidly coupled to the first outlet passage by the second channel. When in the second position, the first inlet port is fluidly coupled to the first outlet passage by the first channel and the second channel. The stator may include a third inlet passage having a third inlet port in the stator face and a second outlet passage having a second outlet port in the stator face, wherein when in the first position, the third inlet port may be fluidly coupled by a third channel in the rotor face to the second outlet passage. The first outlet passage may be fluidly coupled to the third inlet port when in the first position and the second outlet passage is routed to waste. The first outlet passage may be in fluid communication with an analyte trapping means, and when in the first position, the analyte trapping means may be fluidly coupled to the third inlet passage, and when in the second position, the analyte trapping means may be fluidly coupled to a chromatographic separation means. The first inlet passage may be fluidly coupled to a chromatographic separation means. The first inlet port may be positioned substantially at the rotational axis. The first channel in the rotor may extend in a direction radially from the rotational axis and terminates at an end of the second channel. The second channel may extend substantially along a circumference of an imaginary circle formed about the rotational axis, the first and the second channels forming a single connected channel. The second channel and the third channel may extend substantially along a circumference of an imaginary circle formed about the rotational axis, and the first channel may extend in a direction radially from the rotational axis terminating at one end along the circumference at the second channel. The stator element may include seven passages, wherein two of the seven passages are plugged. The rotor face may include four channels where the four channels include the first channel and three other channels. The three other channels may extend substantially along a circumference of an imaginary circle formed about the rotational axis, the first channel extending in a direction radially from the rotational axis and terminating at the circumference at one end of the second channel to connect the first channel to the second channel, the second channel being included in the three other channels. When in the second position, the first channel may fluidly couple the first inlet passage to another port of one of the two plugged passages and the second channel may fluidly couple the another port to the first outlet passage. The first fluid channel and the second fluid channel may be formed as a single channel, the first fluid channel extending radially in a direction from substantially the rotational axis and terminating at a first end of the second channel. The rotary valve may be a trap valve. The rotary valve may be included in a liquid chromatography apparatus.

In accordance with another aspect of the invention is an apparatus comprising: a chromatographic separation means, an analyte trapping means, and a rotary valve fluidly coupled to the analyte trapping means. The rotary valve may include a stator element with a plurality of passages therethrough having corresponding ports at a stator face and a rotor element having a rotor face in contact with the stator face and having a plurality of channels formed therein. The plurality of passages include two inlet passages each fluidly coupled to a different input source and an outlet passage. The rotor face is in contact with the stator face in a fluid tight manner. The rotor element is rotatably movable about a rotational axis relative to the stator face for rotational movement of the rotor face to at least a first position and a second position. When in the first position, at least a portion of the plurality of channels fluidly couples the two inlet passages to the outlet passage to enable mixing a first input source fluidly coupled to a first of the two inlet passages and a second input source fluidly coupled to a second of the two inlet passages producing a resulting flow in the outlet passage. The outlet passage is fluidly coupled to the analyte trapping means to receive at least some of the resulting flow and trap at least one analyte therein. When in the second position, at least a portion of the plurality of channels fluidly couples the first inlet passage to the first outlet passage without fluidly coupling the second inlet passage to the first outlet passage. The first inlet passage is fluidly coupled to an input source that includes a releasing solvent to release at least one analyte trapped in the analyte trapping means so that analytes released from the analyte trapping means are passed to the chromatographic separation means. The apparatus may further include a detector fluidly coupled to the chromatographic separation means. When in the first position, the first input source may be a diluting solvent used to dilute fluid from the second input source. When in the first position, flow output from the analyte trapping means may be diverted via a conduit to a third inlet passage of the stator element fluidly coupled to a second outlet passage of the stator element by one of the plurality of channels. The second outlet passage may be fluidly coupled to waste. A programmable control means may be used to select the first position or the second position to selectively direct flow from the analyte-trapping means to waste when in the first position or to the chromatographic separation means when in the second position. The apparatus may also include means for delivering a flow of eluent, and means for introducing a sample into the flow of eluent to form a flow of an analyte bearing eluent as one of the input sources when the valve is in the first position. The means for delivering a flow of eluent may include a pump. The means for introducing a sample may include an injection valve. The apparatus may include a second chromatographic separation means and the flow of eluent may pass through the second chromatographic separation means. The apparatus may include a pump used to deliver the diluting solvent when the valve is in the first position, and wherein the pump is used to deliver the releasing solvent when the valve is in the second position. The chromatographic separation means may comprise reverse phase separation media. The analyte trapping means may comprise reverse phase separation media. The second chromatographic separation means may comprise reverse phase separation media. The second chromatographic separation means may comprise a strong cation exchange column. The injector valve may be a six port injector valve with a sample loop. The detector may include at least one of a mass spectrometer, UV absorbance detector, and an evaporative light scattering detector.

In accordance with another aspect of the invention is a rotary valve comprising a stator element with a plurality of passages therethrough having corresponding ports at a stator face, and rotor element having a rotor face in contact with the stator face and having a plurality of channels formed therein. The plurality of passages include two inlet passages each fluidly coupled to a different input source and an outlet passage. The rotor face is in contact with the stator face in a fluid tight manner. The rotor element is rotatably movable about a rotational axis relative to the stator face for rotational movement of the rotor face to at least a first position and a second position. When in the first position, at least a portion of the plurality of channels fluidly couples the two inlet passages to the outlet passage to enable mixing a first input source fluidly coupled to a first of the two inlet passages and a second input source fluidly coupled to a second of the two inlet passages. When in the second position, at least a portion of the plurality of channels fluidly couples the first inlet passage to the first outlet passage without fluidly coupling the second inlet passage to the first outlet passage.

In accordance with another aspect of the invention is a method of performing fluid chromatography comprising: providing a chromatographic separation means; providing an analyte trapping means; and providing a rotary valve fluidly coupled to the analyte trapping means. The rotary valve includes a stator element with a plurality of passages therethrough having corresponding ports at a stator ace and a rotor element having a rotor face in contact with the stator face and having a plurality of channels formed therein. The plurality of passages include two inlet passages each fluidly coupled to a different input source and an outlet passage. The rotor face is in contact with the stator face in a fluid tight manner. The rotor element is rotatably movable about a rotational axis relative to the stator face for rotational movement of the rotor face to at least a first position and a second position. The rotary valve is actuated between the first position and the second position. When in the first position, at least a portion of the plurality of channels fluidly couples the two inlet passages to the outlet passage to enable mixing a first input source fluidly coupled to a first of the two inlet passages and a second input source fluidly coupled to a second of the two inlet passages producing a resulting flow in the outlet passage. The outlet passage is fluidly coupled to the analyte trapping means to receive at least some of the resulting flow and trap at least one analyte therein. When in the second position, at least a portion of the plurality of channels fluidly couples the first inlet passage to the first outlet passage without fluidly coupling the second inlet passage to the first outlet passage. When in the second position, the first inlet passage is fluidly coupled to an input source that includes a releasing solvent to release at least one analyte trapped in the analyte trapping means so that analytes released from the analyte trapping means are passed to the chromatographic separation means.

In accordance with another aspect of the invention is a rotor included in a rotary valve apparatus comprising: a first channel extending in a direction radially from a rotational axis of the rotor to a circumference of an imaginary circle formed about the rotational axis; and three channels extending substantially along the circumference and being spaced at an angular distance from one another. The first channel extends substantially from the rotational axis and terminates at one end of a first of the three channels.

In accordance with another aspect of the invention is a valve comprising a rotor and a stator. The rotor includes a plurality of channels formed in a rotor surface thereof, a first of the plurality of channels extending in a direction radially from a rotational axis of the rotor and substantially along an arc shaped portion of a circumference of an imaginary circle formed about the rotational axis, and two of the plurality of channels extending substantially along an arc shaped portion of the circumference and being spaced at an angular distance from one another. The stator includes five passages formed longitudinally therethrough, four of the five passages having openings located at a stator surface where the openings are located substantially along the circumference to overlap with selected ones the plurality of channels when the rotor is rotated to various positions about the rotational axis relative to the stator in order to provide fluid communication between selected ones of passages formed through the stator, a fifth of the five passages having an opening located at the stator surface where the opening is formed substantially at the rotational axis. The rotor surface is in contact with the stator surface of the stator in a fluid tight manner. The rotor is rotatably movable about the rotational axis relative to the stator surface for rotational movement of the rotor surface to at least a first position and a second position. When in the first position, the fifth passage and a first of the four passages are fluidly coupled to a second of the four passages by the first channel, and another of the plurality of channels fluidly couples a third of the four passages with a fourth of the four passages. When in the second position, the first channel fluidly couples the fifth passage to the second of the four passages without fluidly coupling the first passage to the second passage. The stator may include two additional passages formed longitudinally therethrough which are plugged.

In accordance with another aspect of the invention is an apparatus comprising chromatographic separation media, trapping media, and a rotary valve fluidly coupled to the trapping media. The rotary valve includes a stator element with a plurality of passages therethrough having corresponding ports at a stator face and a rotor element having a rotor face in contact with the stator face and having a plurality of channels formed therein. The plurality of passages includes two inlet passages each fluidly coupled to a different input source and an outlet passage. The rotor face is in contact with the stator face in a fluid tight manner and the rotor element is rotatably movable about a rotational axis relative to the stator face for rotational movement of the rotor face to at least a first position and a second position. When in the first position, at least a portion of said plurality of channels fluidly couples the two inlet passages to the outlet passage to enable mixing a first input source fluidly coupled to a first of the two inlet passages and a second input source fluidly coupled to a second of the two inlet passages producing a resulting flow in the outlet passage. The outlet passage is fluidly coupled to the trapping media to receive at least some of the resulting flow and trap at least one analyte therein. When in the second position, at least a portion of said plurality of channels fluidly couples the first inlet passage to the first outlet passage without fluidly coupling the second inlet passage to the first outlet passage. The first inlet passage fluidly is coupled to an input source that includes a releasing solvent to release at least one analyte trapped in the trapping media so that analytes released from the trapping media are passed to the chromatographic separation media.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4A-4B are examples illustrating different positions associated with an embodiment of a valve in accordance with techniques described herein.

DETAILED DESCRIPTION OF EMBODIMENT(S)

Figure 1:
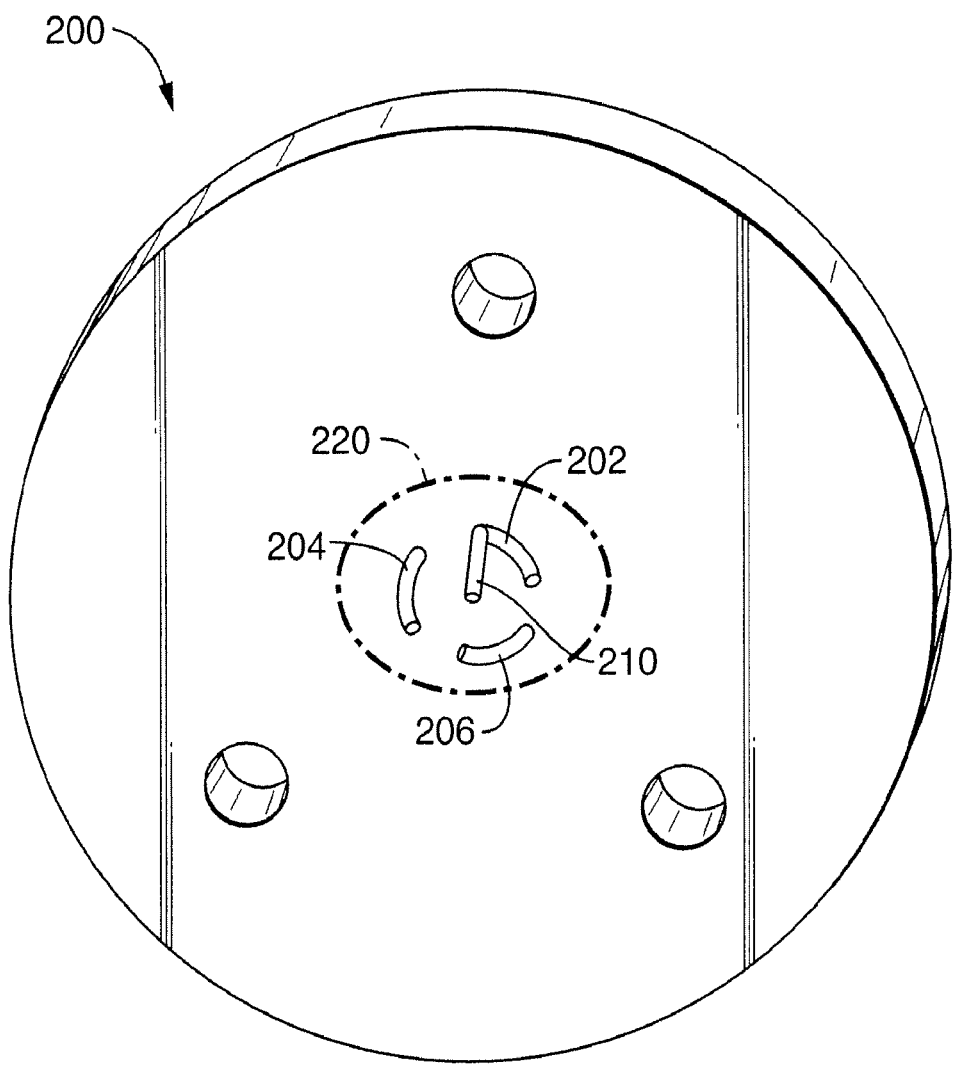
FIG. 1 is an example illustrating a rotor and associated pattern that may be used in an embodiment of a valve in accordance with the techniques described herein.

Described in following paragraphs are techniques that may be used in connection with a system such as a liquid chromatography (LC) system. The LC system may be, for example, a High Performance Liquid Chromatography (HPLC) or an Ultra Performance Liquid Chromatography (UPLC) system such as the ACQUITY UPLC® and nanoACQUITY UPLC® systems from Waters Corporation of Milford Mass. An LC system such as the foregoing from Waters Corporation may operate under high pressure such as in the range of 5000 PSI (e.g, exemplary for some HPLC systems) to 15000 PSI (exemplary for some UPLC systems). An LC system may include components such as rotating valves used for a variety of different purposes. For example, a typical LC system may include an injector valve that is a rotary valve used to inject controlled volumes of a sample, either manually or automatically, into a fluid stream which carries the sample to a chromatographic separation column where the sample may then be separated. The injector valve may be used in connection with controlling or regulating the introduction of fixed volumes of a sample for analysis in the LC system. A rotary valve may also be used as a trap valve in connection with additional processing performed in an LC system such as with an analyte trapping means with single or multi-dimensional chromatography as described, for example, in International Publication No. WO 2008/036586, published Mar. 27, 2008, (PCT patent application no. PCT/US2007/078618) APPARATUS AND METHODS OF FLUID CHROMATOGRAPHY, Liu, et al., (also referred to herein as the "Liu patent application") which is incorporated by reference herein.

As will be described in more detail in following paragraphs, embodiments of a valve set forth herein may be used in an LC system as well as, more generally, with any system for any purposes. Embodiments of the valve herein may be used to facilitate mixing or combining fluids. As will be appreciated by those skilled in the art, a valve assembly may include other parts and may have additional detail than as described herein for purposes of illustrating the techniques herein. Additionally, it should be noted that any details provided in examples herein regarding the valve assembly are for purposes of illustration and should not be construed as a limitation.

Valve assemblies, for example, as described in International Publication No. WO 2005/079543 A2 (PCT/US2005/005714) PIN VALVE ASSEMBLY, Keene et al., which is incorporated by reference herein, are generally known in the art. A rotary valve is a type of valve where fluid flow is directed by rotating a valve rotor element to different discrete angular positions relative to a stationary stator element. The stator and a rotor act together to connect or align rotor grooves or channels with passages of the stator so that the rotor grooves provide for different fluidic connections between selected passages through the stator depending on the relative position of the rotor with respect to the stator. The rotor may be actuated in a rotational manner relative to the axis of the valve in order to vary the position of the rotor relative to the stator, which remains stationary. A first surface of the rotor may face a surface of the stator. The rotor may be a removable disk which, as will be described in following paragraphs, may include a pattern of one or more grooves or channels formed on the first surface. The rotor may be included in a valve assembly including a drive shaft coupled to another component, such as an engine or motor, to facilitate actuating the valve assembly as will also be described in connection with loading a volume of sample. Additionally, the valve described herein may have a first rotational position of the rotor relative to the stator wherein fluids passing through two inlet passages of the valve may be combined and directed to a first outlet passage of the valve. The valve may also have a second rotational position of the rotor relative to the stator which does not provide such mixing but rather fluidly connects one of the foregoing inlet passages with the first outlet passage.

What will now be described is a rotor having a pattern formed on a surface thereof in accordance with an embodiment of a valve incorporating techniques described herein. The rotor may be included in a rotating valve of an LC system.

It should be noted that exemplary measurements are included in connection with figures herein such as those for embodiments of the rotor and stator. The measurements provided in following figures are approximate values and in inches unless otherwise indicated such as those angular degree measurements. The measurements indicated are only examples of what may be included in an embodiment for purposes of illustration and should not be construed as a limitation of techniques herein.

Figure 2:
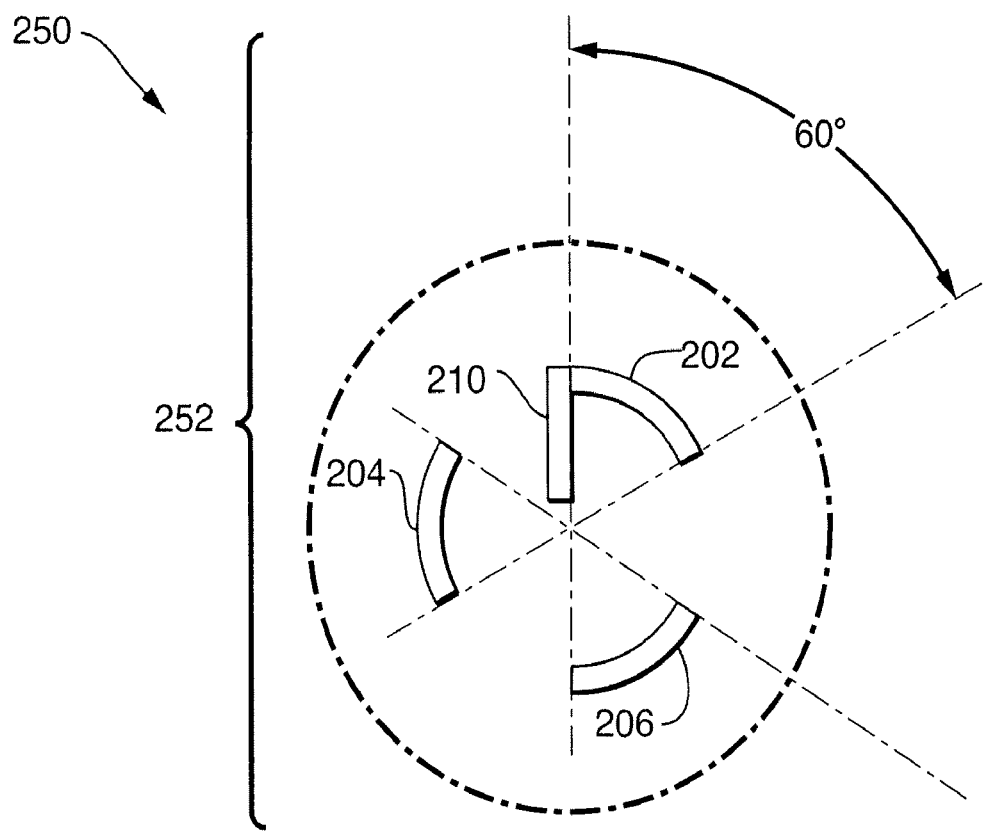
FIG. 2 is an example illustrating in more detail the grooves patterned on a rotor surface in an embodiment of a valve in accordance with the techniques herein.

Referring to FIG. 1, shown is an illustration of an embodiment of a rotor that may be included in an embodiment of a valve in accordance with techniques described herein. The rotor of FIG. 1 is a disc-shaped rotor that may be included in a valve assembly such as a valve as will be described in more detail in following paragraphs. The rotor in the example 200 of FIG. 1 may include 4 grooves 202, 204, 206 and 210. The example 200 illustrates a surface of the rotor having 4 grooves formed on the rotor surface that faces a surface of the stator in an assembled valve. It should be noted that also illustrated are 3 through holes that may be formed in the rotor. The through holes may be used to position the rotor in the valve assembly. For example, another part (not shown) included in the valve assembly and in contact with a surface of the rotor not facing the stator may include 3 protrusions with positions corresponding to each of the 3 through holes. Element 220 denotes an imaginary circle about which additional details are provided as illustrated in FIG. 2. With reference to FIGS. 1 and 2, each of the grooves 202, 204, 206 and 210 may be of varying dimensions in accordance with the particular valve.

With reference to FIG. 2, each of the grooves 202, 204 and 206 in this example are located substantially a same distance R from the center of the rotor about its rotational axis and are arc shaped to extend substantially along a portion of a same circumference of an imaginary circle having radius R. In this example 252, the foregoing imaginary circle may have an exemplary diameter of 0.100 inches. Each of the grooves 202, 204, and 206 has a sufficient length to extend about a portion of the circumference associated with approximately a 60 degree angle. Each of the grooves 202, 204, and 206 is positioned to be equidistant from the other grooves along the circumference. Groove 210 extends in a direction radially from the rotational axis of the rotor. The groove 210 has a first end which is located substantially at the rotational axis and extends to, and terminates at, one end of groove 202. In one aspect, groove 210 and groove 202 may be characterized as, and formed as, a single groove whereby grooves 210 and 202 are connected as illustrated forming a single channel in the rotor surface.

As described herein, the pattern formed on a surface of the rotor may comprise grooves or channels. An embodiment may utilize rotor grooves which are a variation of that described above. For example, the rotor grooves may be located at different angular positions relative to one another, and/or may be located a different distance from the rotational axis than as illustrated in FIGS. 1 and 2.

As will be described in more detail below, a stator may be included in a valve assembly with the rotor of FIGS. 1 and 2. As known in the art and also described in more detail below, the stator may have a first surface which is not in contact with a surface of the rotor and a second opposing surface which is in contact with the rotor surface having grooves formed therein such as illustrated in FIGS. 1 and 2. The foregoing first surface of the stator may include a number of ports, such as 7 ports having corresponding port holes through the stator with openings on the second surface. An opening for one of the port holes formed on the second stator surface facing the rotor may be located at substantially the rotational axis and may align or mate with one end of rotor groove 210. The openings of the remaining 6 port holes formed on the second surface of the stator facing the rotor are located substantially at a same distance from the center or rotational axis as the 3 grooves 202, 204 and 206 in the rotor of FIGS. 1 and 2. The foregoing provides for the openings of the 7 port holes on the second stator surface (in contact with the rotor) being in alignment with the rotor grooves 202, 204, 206 and 210.

The rotor actuates in a rotational fashion about its center rotational axis. The actuation causes the grooves located on the rotor surface facing the stator to move providing different fluidic connections to different ports of the stator where a groove forms a channel between two ports through which fluid flows. Tubes may be connected to ports of the stator in the first surface (not facing the rotor) in connection with forming fluid paths.

Figure 3C:
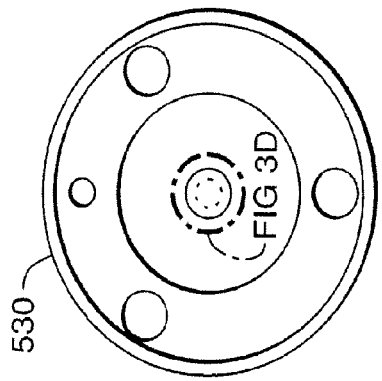
FIGS. 3A-3E are examples illustrating different views of a stator that may be used with the rotor of FIG. 1 in an embodiment of a valve in accordance with techniques described herein.
Figure 3B:
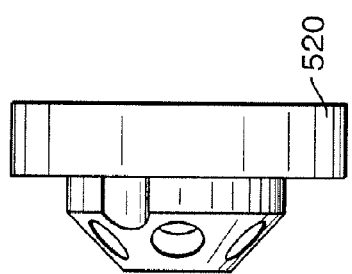
Figure 3E:
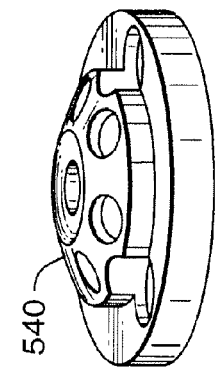
Figure 3A:
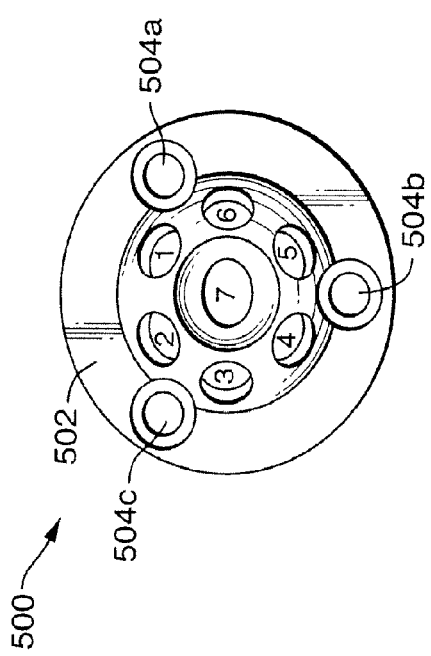
Figure 3D:
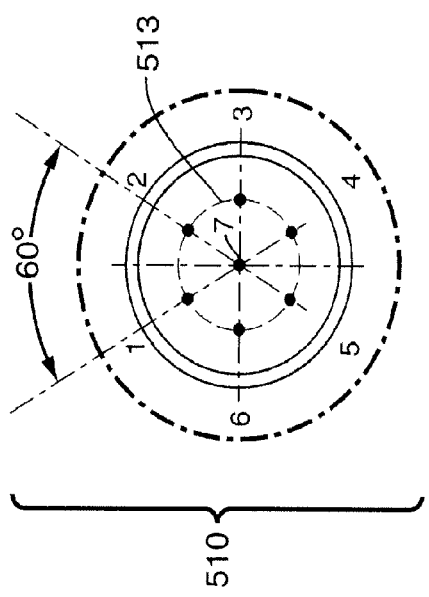

Referring to FIGS. 3A-3E, shown are exemplary views illustrating an embodiment of a stator that may be used in an embodiment of a valve with the rotor as described in connection with FIGS. 1 and 2 above. Element 502 of FIG. 3A provides a view of one surface of the stator including 7 ports. The face of the stator indicated in 502 may be the surface of the stator which does not come into contact with the rotor surface. Elements 504a-c may be through holes formed in the stator through which screws may be inserted as a means of securing the stator to other parts comprising the valve assembly. Element 530 of FIG. 3C provides a view of the opposing surface of the stator from that illustrated in 502. When included in an assembled valve, the surface illustrated in 530 faces the rotor having the grooved pattern as illustrated in FIGS. 1 and 2. Element 540 of FIG. 3E and element 520 of FIG. 3B provide an additional views of the stator. Element 510 of FIG. 3D provides a more detailed view of an inner portion of the stator surface of 530 facing the rotor. The port holes 1-7 as illustrated in 502 have associated passages which pass through the stator and which having corresponding openings 1-7 on the opposing surface as indicated in 510. The openings 1-6 in 510 may be located a same distance or radius R from the center of the stator along a circumference of an imaginary circle indicated by 513. The openings 1-6 of 510 may be positioned substantially equidistant from each other along 513. Port hole 7 has a corresponding opening as illustrated located substantially at the rotational axis about the center of the rotor. The openings 1-6 located on the surface along the circumference represented by 513 are located at substantially the same distance R from the rotational axis as the grooves 202, 204 and 206 of FIGS. 1 and 2 so that the grooves of the rotor provide fluidic connections between different ports and passages through the stator when rotor is rotated to different angular positions about its rotational axis through center. The opening 7 may be positioned to overlap a portion of groove 210 so that groove 210 may be used to fluidly couple the opening 7 (and passage through the stator terminating at opening 7) to other openings in the surface of the stator facing the rotor and their respective passages through the stator.

What will now be illustrated in more detail is how the rotor and stator described above may be positioned relative to one another to form different fluidic connections in one embodiment of a valve in accordance with techniques herein. The positioning of the rotor relative to the stator will be generally described as having a first position providing for mixing or combining two input sources fluidly coupled to two inlet passages of the stator resulting in a single combined fluid path output through a third stator outlet passage where the two inlet passages are coupled to the outlet passage, respectively, by a first groove or channel and a second groove or channel formed in a surface of the rotor as illustrated in FIGS. 1 and 2. When in the first position, a first inlet port of a first inlet passage is fluidly coupled to the outlet passage by the first channel, and a second inlet port of a second inlet passage is fluidly coupled to the outlet passage by the second channel. A second position of the rotor relative to the stator will also be described wherein, in the second position, one of the two inlet passages is fluidly coupled to the outlet passage using both the first and second grooves or channels without fluidly coupling the second inlet passage to the outlet passage. When in the second position, an inlet port of one of the two inlet passages is fluidly coupled to the outlet passage by both the first channel and the second channel. Subsequently in following description, a particular example of the valve will then be described in which the embodiment of the valve is used as a trap valve in a system or apparatus performing multi-dimensional liquid chromatography separation.

Referring to FIGS. 4A-4B, shown are examples of 550 illustrating a first position 560 and a second position 570 of the rotor relative to the stator. The examples of 550 illustrate ports and associated passages numbered from the perspective of a face of the stator not facing the rotor (e.g., numbered in accordance with element 502 of FIG. 3A ordering). Each of the numbered elements 1-7 in 560 and 570 is associated with a passage through the stator where the passage has a port or opening at one end at a surface of the stator not facing the rotor, and another port or opening at another end at an opposing surface of the stator facing the rotor. Any of the ports 1-7 and associated passages may be characterized as being an inlet or outlet with respect to fluid flow in the valve 40 depending on the valve configuration and use. Those ports having associated passages through the stator used as inlet and outlet passages may have conduits or tubing (not illustrated) fluidly connected thereto at a surface of the stator not facing or in contact with the rotor. An inlet passage of the valve 40 is one in which fluid flow is into the valve and the inlet passage has associated inlet ports or openings at the ends of the inlet passage located at stator surfaces. An outlet passage of valve 40 is one in which fluid flow is out of the valve and the outlet passage has associated outlet ports or openings at the ends of the outlet passage located at the stator surfaces.

In connection with the first position illustrated by 560 of FIG. 4A, ports 7 and 4 are connected to passages of the stator used as inlet passages and the passage associated with port 5 may be an outlet passage. When in the first position of 560, fluid input through port 7 is mixed or combined with fluid input through port 4 producing a combined fluid flow path which is then output through port 5. When in the first position with respect to openings or ports located on the surface of the stator facing the rotor, port 7 is fluidly coupled by groove 210 to port 5 and port 4 is fluidly coupled by groove 202 to port 5. As described in more detail below when in this first position, the fluid output from port 5 may be fluidly coupled to port 2 (such as using conduit or tubing and a connector over a path where fluid may also pass through one or more other intervening components). Port 2 is fluidly coupled, by groove 206, to port 3. Port 3 may be diverted or directed to waste. Also in this first position, groove 204 connects ports 1 and 6 which in this example are plugged so that no fluid enters passages in the stator associated with these ports. Passages through the stator associated with ports 1 and 6 are not utilized for fluid flow therethrough in this exemplary embodiment.

In connection with the second position illustrated by 570 of FIG. 4B, the rotor may be rotated about its rotational axis to facilitate the illustrated fluidic connections. In this second position, input sources may still be fluidly connected to ports 4 and 7 as described above. However, due to the positioning of the rotor, port 4 is fluidly coupled to port 3 which is directed to waste so that fluid input through port 4 is directed to waste. Port 7 is fluidly coupled, in sequence, to port 6 (by groove 210) and then to port 5 (by groove 202). Thus, port 7 is fluidly coupled to port 5 by grooves 210 and 202. As described elsewhere herein, grooves 210 and 202 may be physically connected and form a single continuous groove or channel. Since port 6 is plugged, the fluid path from port 7 flows through groove 210 to groove 202 and then to port 5. As described in more detail below when in this second position, the fluid output from port 5 may be directed along another path (via conduits or tubing and a connector and including other components through which fluid flows) which is not fluidly coupled to port 2 (as described above with the first position). Also in this second position, groove 204 connects ports 1 and 2.

As will be described in more detail below, the valve may be used as a trap valve where the first position 560 is denoted as a trap position to facilitate trapping of analytes in a trapping means and the second position 570 is denoted as a run or release position to facilitate release of analytes from the trapping means.

Figure 5:
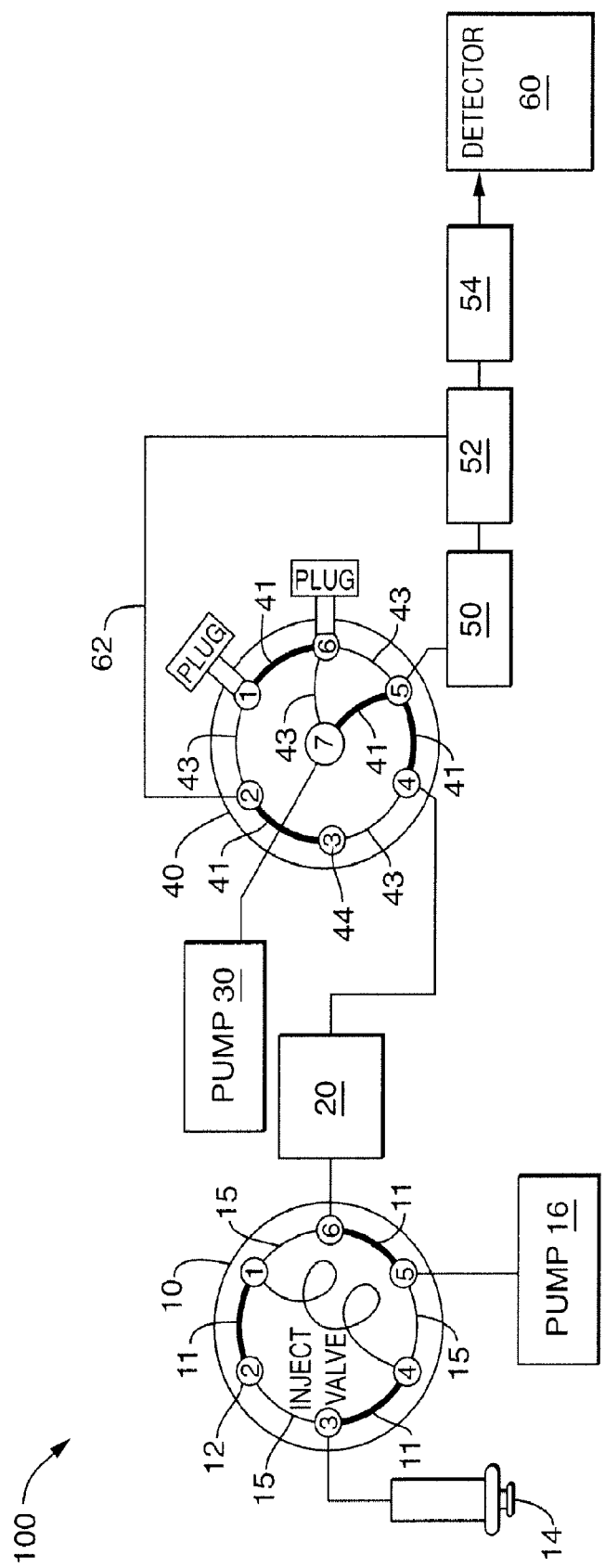
FIG. 5 is an example of a system that may utilize an embodiment of a valve in accordance with techniques described herein.

Referring to FIG. 5, shown is an example illustrating use of an embodiment of the valve described herein in connection with carrying out multi-dimensional chromatography. In the example 100, an instance of the valve described above is denoted as valve 40 and may be used in performing multi-dimensional chromatography as described in the Liu patent application incorporated by reference elsewhere herein. In particular, the example 100 illustrates components that may be used in carrying out the multi-dimensional chromatography method illustrated in connection with FIG. 3 in the Liu patent application. The components of the example 100 of FIG. 5 in this application may be used rather than the components described in connection with FIG. 3 of the Liu patent application whereby the valve 40 described herein also provides for mixing of two input sources rather require use of additional components, such as a T connector 15 as described in FIG. 3 in the Liu patent application.

The example 100 of FIG. 5 includes an injector valve 10, needle 12, pump 16, syringe 14, first chromatographic separation means 20, pump 30, trap valve 40, trapping means 50, connector 52 (such as a T connector), second chromatographic separation means 54 and a detector 60. Although not illustrated, one or more of the components of the example 100 may be connected to a computer system or other means for programmatically and automatically controlling one or more of the one or more components. For example, a computer system may be programmed to automate switching and actuating the injection valve 10 and valve 40 to various rotational positions during operation as well as control operation of the pumps 16 and 30. The trap valve 40 may be a valve using the rotor and stator as described above where the rotor may be actuated to different positions as described in FIGS. 4A and 4B.

A sample solution, such as comprising analytes, may be introduced into the flow of eluent using the injection valve 10 illustrated with a sample loop. The injection valve 10 of 100 is another example of a rotary valve which includes a rotor and stator and operates by rotating the rotor to various angular positions relative to a surface of the stator. The valve 10 operates in a manner similar to that as described above with the difference that the rotor may include a different groove pattern than described above, the stator may include different passages therethrough than as described (e.g. 6 passages in valve 10 rather than 7 as in valve 40), and the fluidic connections are provided as needed for injecting controlled amounts of sample into the system. A sample drawn in through needle 12 may be introduced using syringe 14 into the sample loop. The sample may be forced out of the sample loop by applying pressure such as using a pump 16. Any of the ports of the valve 10 may be inlet or outlet ports. The injector valve 10 may include a rotor that is actuated to different positions relative to a stationary stator in order to load and then inject volumes of a sample into the LC system. For example, with the 6 port stator and the rotor of the valve 10, the sample loop is connected to ports 1 and 4, with a sample injected through port 2. When in the load position the links 11 illustrate the fluidic connections provided. In the load position, the sample is drawn in from port 2 via syringe 14 and passes through a groove connecting ports 2 and 1, and into the sample loop. The rotor may then be actuated to a second injection position where the links 15 illustrate the fluidic connections provided. When the rotor is actuated to the second injection position, a first rotor groove connects ports 5 and 4 and a second rotor groove connects ports 1 and 6. Pressure may be introduced through port 5 via pump 16 to force fluid out of the sample loop through the second rotor groove, and the fluid then exits through port 6, such as may be fluidly connected to the first chromatographic separation means 20 on which some of the analytes may be temporarily retained. A flow from the separation means 20 passes through a conduit or tubing to valve 40.

The method described in the Liu patent application may be performed using the components illustrated in the example 100 of FIG. 5 herein where valve 40 facilitates mixing or diluting of a solvent with the flow output from the first chromatographic separation means 20. Specifically, the output from the first chromatographic separation means 20 (fluidly coupled to port 4 of valve 40) may be diluted with a diluting solvent (fluidly coupled to port 7 of valve 40) when the valve 40 is in a first trap position. In this manner, the valve 40 provides for mixing the output of the first chromatographic separation means 20 (input through port 4) with the diluting solvent (input through port 7) which produces a flow of resulting diluted output (output through port 5). Also, due to the position of the valve 40 when in this first trap position, the flow of resulting diluted output is directed out of port 5 which is fluidly coupled to a trapping means 50 where analytes are trapped. While analytes are being trapped in the trapping means 50, flow exiting is routed to waste as described below in more detail. In a next step, the valve 40 is actuated to a second run position. A releasing solvent (input through port 7) may then be used to effectively cause the trapped analytes in the trapping means 50 to be released and flow to the second chromatographic separation means 54.

With reference to the example 100, the first trap position is illustrated by links 41 denoting the fluidic connections facilitated by the grooves of the rotor with respect to the stator. When the valve 40 is in the first trap position, a fluid path is defined from the output of the first chromatographic separation means 20, to port 4, port 5, trapping means 50, connection 52, conduit or tubing 62, port 2, and then out to port 3 (to waste). Port 3 may be connected to a low-pressure discharge point so that the flow from and through trapping means 50 is routed via connector 52 to valve 40 (via 52 and 62) rather than being forced through the second chromatographic means 54 when in the trap position. When the valve 40 is in the first trap position, the diluting solvent is input using a pump 30 into port 7 which is fluidly coupled to port 5. Also when in the first trap position, the output from the first chromatographic separation means 20, which enters valve 40 through port 4, is fluidly coupled to port 5. The diluting solvent (input at port 7) and the output of the first chromatographic separation means (input at port 4) mix when exiting out through port 5. The output from port 5 is the resulting diluted output described above which passes through the trapping means 50 and has a fluid path as described above.

With reference to the example 100, the second run position is illustrated by links 43 denoting the fluidic connections facilitated by the grooves of the rotor with respect to the stator. When the valve 40 is in the run position, a releasing solvent may then be introduced using the pump 30 into port 7 over the fluid path defined by grooves ports 7, 6, and 5 of valve 40 and then to the trapping means 50 where the releasing solvent causes trapped analytes therein to be released. The released analytes from the trapping means 50 flow through the connector 52 and are directed to the second chromatographic separation means 54 so that the released analytes may be separated by means 54 and then subsequently detected by detector 60. Note that in this run position, port 6 is plugged so the releasing solvent flows in through port 7 into the grooves connecting ports 7, 6, and then 5 where the releasing solvent then exits through port 5 and flows through the trapping means 50.

After a first batch of analytes from the first chromatographic separation means 20 has been released, trapped in the analyte trapping means 50, and subsequently released and separated on the second chromatographic separation means 54, the foregoing process may be repeated. As will be appreciated by those skilled in the art, the multidimensional chromatographic apparatus as illustrated in FIG. 5 may be configured and operated in a variety of different ways. In accordance with the methods described in the Liu patent application as may be performed using the valve 40 herein, additional detail and variations from those described herein are set forth in the Liu application and will also be appreciated by those skilled in the art.

Any suitable chromatographic columns may be used for the first and second chromatographic separation means 20 and 50 and may include any suitable chromatographic separation media. The analyte trapping means 50 may be a trapping column and may comprise trapping media such as media having similar separation properties to that used in the second chromatographic separation means. Any suitable media and suitable releasing solvent may be used so that at least some analytes present in a sample are trapped and subsequently released. A chromatography column or cartridge as used herein may denote a flow-through device generally cylindrical in shape having a solid phase separation medium therein. The solid phase separation media may be particulate beads, fibers or monolithic.

One or more of the first and second chromatographic separation means and the analyte trapping media may comprise reverse-phase (RP) separation media, normal phase separation media, and/or SCX (strong cation exchange) media depending on the particular method performed. For example, as described in the Liu application, all of the first and second chromatographic separation and trapping media may comprise reverse phase separation media. As another example, the first chromatographic separation means may use SCX media and the second chromatographic separation means may use RP media, such as a nanoflow RP column.

Pumps 16 and 30 may be any suitable high pressure fluid pump. In one embodiment as described herein with the Liu patent application, pump 30 may be a binary gradient liquid chromatography pump such as, for example, a nanoAQUITY™ pump available from Waters Corporation, Milford, Mass. This pump can be used to provide a solvent gradient of gradually increasing strength (that is, an increasing proportion of organic solvent) which serves both as a releasing solvent (to release analytes from the analyte trapping means 16) and as a gradient elution solvent to separate analytes on the second chromatographic separation means. Pump 30 may also be used to deliver a flow of diluting solvent, such as comprising a high proportion of an aqueous solvent, while analytes are being trapped in the analyte trapping means 50 when the valve 40 is in the trap position. It will be appreciated that in an RP/RP separation, the addition of an aqueous diluting solvent reduces the strength of the fluid flow that enters the analyte-trapping means 50 preventing premature release of the analytes that might otherwise occur if the eluent is too strong. This greatly reduces restrictions on the composition of the eluent used to release analytes from the first chromatographic separation means and improves the performance and versatility of the RP/RP method that may be performed using an embodiment of the valve 40 as described herein.

Means for introducing a sample may include, for example, a six port injection valve and a sample loop as illustrated in FIG. 5. As will be appreciated by those skilled in the art, other embodiments may use different injection valves and may also alternatively introduce a sample using an automated sampling mechanism such as may be controlled by a computer, specialized hardware and/or software, or other suitable programmable control means. As used herein, a programmable control means refers to a central processing unit (CPU), computer, microprocessor, or other suitable microelectronic device. Such control means is for controlling the means for delivering a flow of eluent (such as a pump), the means for introducing a sample, the means for adding a diluting solvent (such as a pump), and means for introducing a releasing solvent (such as a pump). As described herein, the means for delivering a flow of eluent and the means for adding or delivering a flow of diluting solvent comprise high-pressure liquid-chromatography pumps, at least one of which may be a binary pump capable of generating a flow of solvent whose composition changes with time.

The detector 60 may be any suitable detector such as a mass spectrometer, a UV absorbance detector, an evaporative light scattering detector, and the like.

Although an exemplary embodiment of FIG. 5 including valve 40 is illustrated with a system for performing multidimensional chromatography, the valve 40 may also be used in other systems when performing other methods such as in a system when performing one dimensional chromatography. For example, with respect to FIG. 5, an embodiment may utilize the valve 40 in a system which omits the first chromatographic separation means 20 where, when in the first trap position as described herein, the fluid input via port 4 of valve 40 may come directly from the injection valve 10 without passing through an intervening component or media such as represented by element 20.

It should be noted that the rotor and stator as may be used in an embodiment of a valve described herein (such as valve 40 of FIG. 5) as well as for the injection valve (such as valve 10 of FIG. 5) may be made of any suitable materials and using any suitable technique known in the art. For example, the rotor can be made of a base polymer and, optionally, one or more other materials in a homogeneous combination. Such other materials may be added to increase the strength and provide fiber reinforcement and other materials may be added as filler. For example, the rotor can be made of a PEEK (polyether-ether-ketone) polymer material with 30% carbon fiber. The rotor may also be made with other polymers such as, for example, Ryton PPS (Polyphenylene Sulfide), VESPEL SP1, and a polyimide. Materials such as carbon or glass fibers may be added to provide strength and reinforcement. Additionally, fillers such as Teflon and/or graphite may be used in combination with the carbon, glass or other fibers. The particular blend of materials, such as the amount and/or types of fillers and reinforcement fiber used, may vary based on the specific materials included and the particular fabrication technique used to produce the rotor. The stator used in the injection valve 10 as well as the valve 40 may be made, for example, of stainless steel or other suitable material and manufactured using techniques known in the art. The stator may optionally have a diamond-like carbon (DLC) coating formed on all or portions of the surface facing the rotor. For example, the stator may be a type of stainless steel alloy such as of type 316 (S31600), 318, Nitronic 60, A-286, Inconel 718, and the like. The grooves or patterns such as on the surface of a rotor as described herein may be formed using any suitable technique such as, for example, using a machine (such as a drill), using an embossing technique by applying pressure, alone or in combination with heat, such as described in U.S. Provisional Patent Application No. 61/108,965, filed on Oct. 28, 2008, TECHNIQUES FOR PATTERNING VALVE COMPONENTS, which is incorporated by reference herein, and the like.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A rotary valve comprising:
   a stator element defining a first inlet passage fluidly coupled to a first fluid source and having a first inlet port at a stator face and defining a second inlet passage fluidly coupled to a second fluid source and having a second inlet port at the stator face, said stator element further defining a first outlet passage having a first outlet port at said stator face; and
   a rotor element having a rotor face in contact with the stator face and having a first channel and a second channel formed therein, the rotor face being in contact with the stator face in a fluid tight manner, said rotor element being rotatably movable about a rotational axis relative to the stator face for rotational movement of the rotor face to at least a first position and a second position, wherein when in said first position, said first inlet port is fluidly coupled to said first outlet passage by said first channel and said second inlet port is fluidly coupled to said first outlet passage by said second channel, and when in said second position, said first inlet port is fluidly coupled to said first outlet passage by said first channel and said second channel.

2. The rotary valve of claim 1, wherein the stator includes a third inlet passage having a third inlet port in the stator face and a second outlet passage having a second outlet port in the stator face, wherein when in said first position, said third inlet port is fluidly coupled by a third channel in said rotor face to said second outlet passage.

3. The rotary valve of claim 2, wherein said first outlet passage is fluidly coupled to said third inlet port when in said first position and said second outlet passage is routed to waste.

4. The rotary valve of claim 2, wherein said first outlet passage is in fluid communication with an analyte trapping means, and when in said first position, said analyte trapping means is fluidly coupled to said third inlet passage, and when in said second position, said analyte trapping means is fluidly coupled to a chromatographic separation means.

5. The rotary valve of claim 2, wherein the second channel and the third channel extend substantially along a circumference of an imaginary circle formed about the rotational axis, and the first channel extends in a direction radially from the rotational axis terminating at one end along said circumference at said second channel.

6. The rotary valve of claim 1, wherein said first inlet passage is fluidly coupled to chromatographic separation means.

7. The rotary value of claim 1, wherein said first inlet port is positioned substantially at the rotational axis, said first channel in said rotor extends in a direction radially from the rotational axis and terminates at an end of said second channel, and said second channel extends substantially along a circumference of an imaginary circle formed about the rotational axis, said first and said second channels forming a single connected channel.

8. The rotary valve of claim 1, wherein the stator element includes seven passages, wherein two of said seven passages are plugged, said rotor face including four channels, said four channels including said first channel and three other channels, wherein said three other channels extend substantially along a circumference of an imaginary circle formed about the rotational axis, said first channel extending in a direction radially from the rotational axis and terminating at said circumference at one end of said second channel to connect said first channel to the second channel, said second channel being included in said three other channels, and wherein, when in the second position, the first channel fluidly couples said first inlet passage to another port of one of said two plugged passages and said second channel fluidly couples said another port to said first outlet passage.

9. The rotary valve of claim 1, wherein the first fluid channel and the second fluid channel are formed as a single channel, said first fluid channel extending radially in a direction from substantially said rotational axis and terminating at a first end of said second channel.

10. The rotary valve of claim 1, wherein the rotary valve is used as a trap valve.

11. The rotary valve of claim 1, wherein the rotary valve is included in a liquid chromatography apparatus.

12. A rotary valve comprising:
a stator element with a plurality of passages therethrough having corresponding ports at a stator face; and
a rotor element having a rotor face in contact with the stator face and having a plurality of channels formed therein, the plurality of passages including two inlet passages each fluidly coupled to a different input source and an outlet passage, the rotor face being in contact with the stator face in a fluid tight manner, said rotor element being rotatably movable about a rotational axis relative to the stator face for rotational movement of the rotor face to at least a first position and a second, position; and
wherein, when in said first position, at least a portion of said plurality of channels fluidly couples the two inlet passages to said outlet passage to enable mixing a first input source fluidly coupled to a first of said two inlet passages and a second input source fluidly coupled to a second of said two inlet passages, and wherein, when in the second position, at least a portion of said plurality of channels fluidly couples said first inlet passage to said first outlet passage without fluidly coupling said second inlet passage to said first outlet passage.

13. A valve comprising:
a rotor including a plurality of channels formed in a rotor surface thereof, a first of said plurality of channels extending in a direction radially from a rotational axis of the rotor and substantially along an arc shaped portion of a circumference of an imaginary circle formed about said rotational axis, and two of said plurality of channels extending substantially along an arc shaped portion of said circumference and being spaced at an angular distance from one another; and
a stator including five passages formed longitudinally therethrough, four of said five passages having openings located at a stator surface where the openings are located substantially along said circumference to overlap with selected ones said plurality of channels when said rotor is rotated to various positions about the rotational axis relative to the stator in order to provide fluid communication between selected ones of passages formed through the stator, a fifth of said five passages having an opening located at the stator surface where the opening is formed substantially at said rotational axis, the rotor surface being in contact with the stator surface of the stator in a fluid tight manner, said rotor being rotatably movable about the rotational axis relative to the stator surface for rotational movement of the rotor surface to at least a first position and a second position, wherein, when in the first position, said fifth passage and a first of said four passages are fluidly coupled to a second of said four passages by the first channel, and another of said plurality of channels fluidly couples a third of said four passages with a fourth of said four passages, and wherein when in said second position, said first channel fluidly couples said fifth passage to said second of said four passages without fluidly coupling said first passage to said second passage.

14. The valve of claim 13, wherein the stator includes two additional passages formed longitudinally therethrough which are plugged.

* * * * *